United States Patent
Walkowski et al.

(10) Patent No.: US 7,306,017 B2
(45) Date of Patent: Dec. 11, 2007

(54) CAPLESS FILLER NECK ASSEMBLY FOR A FUEL TANK

(75) Inventors: Paul D. Walkowski, Ann Arbor, MI (US); Robert P. Benjey, Dexter, MI (US)

(73) Assignee: Eaton Corporation, Cleveland, OH (US)

( * ) Notice: Subject to any disclaimer, the term of this patent is extended or adjusted under 35 U.S.C. 154(b) by 285 days.

(21) Appl. No.: 11/040,866

(22) Filed: Jan. 21, 2005

(65) Prior Publication Data

US 2006/0162812 A1 Jul. 27, 2006

(51) Int. Cl.
*B65B 1/04* (2006.01)

(52) U.S. Cl. ............... 141/350; 141/348; 141/349; 141/301; 220/86.2

(58) Field of Classification Search .......... 141/301, 141/312, 348–350; 220/86.2, DIG. 33; 137/587–589
See application file for complete search history.

(56) References Cited

U.S. PATENT DOCUMENTS

| | | | |
|---|---|---|---|
| 3,075,547 A | 1/1963 | Scaramucci | |
| 4,825,902 A | 5/1989 | Helms | |
| 6,155,316 A | 12/2000 | Benjey | |
| 6,679,396 B1 | 1/2004 | Foltz | |
| 7,096,899 B2 * | 8/2006 | Vetter et al. | 141/350 |
| 7,163,037 B2 * | 1/2007 | Walkowski | 141/350 |
| 2005/0178469 A1 | 8/2005 | Vetter | |

FOREIGN PATENT DOCUMENTS

| | | |
|---|---|---|
| EP | 1 065 086 A2 | 1/2001 |
| EP | 1 359 043 A2 | 11/2003 |
| EP | 1 555 155 A2 | 7/2005 |

OTHER PUBLICATIONS

PCT Search Report, PCT/IB2006/000095 search completed May 18, 2006.

* cited by examiner

*Primary Examiner*—Timothy L. Maust
(74) *Attorney, Agent, or Firm*—Anna M. Shih

(57) ABSTRACT

A capless seal door for a fuel tank filler tube employs a door valve with a flexible annular seal which, upon closing against a seat on the undersurface of a nozzle-receiving orifice formed in a bulkhead across the tube, initially wipes on the seat and is subsequently compressed thereon.

15 Claims, 5 Drawing Sheets

US 7,306,017 B2

CAPLESS FILLER NECK ASSEMBLY FOR A FUEL TANK

BACKGROUND OF THE INVENTION

The present invention relates to filler tube assemblies for fuel tanks and particularly fuel tanks employed on passenger car and light truck vehicles. Such fuel tanks and fuel systems for motor vehicles have recently become subject to mandated requirements limiting fuel vapor emissions into the atmosphere. In addition, it has more recently been required to provide a vehicle on-board diagnostic system to detect leakage of fuel vapors from the tank and fuel system during periods of engine inoperation. The on-board diagnostics (OBDII) requires a slight vacuum or positive pressurization within the tank to conduct the leak test; and, therefore, the entire fuel system including the tank filler tube or neck must be capable of being tightly sealed.

The requirement that the fuel system including the tank and the filler neck be tightly sealed to prevent vapor emission to the atmosphere and enable diagnostic testing with a slight pressure difference from atmospheric in the tank has resulted in problems in manufacturing the fuel tank and filler, inasmuch as the filler tube cap has been found to be a source of leakage when improperly replaced or insufficiently tightened after refueling. Thus, it has been desired to provide a way or means of eliminating the filler tube cap on motor vehicle fuel tank systems and yet provide for refueling with a conventional dispensing nozzle and to provide closure upon the nozzle removal in a manner that ensures vapor tight sealing.

Heretofore, proposals for capless filler tubes for motor vehicle fuel tanks have been complicated, bulky, difficult to manufacture and assemble in the vehicle and consequently relatively high in cost. Thus, it has long been desired to provide a simple relatively low cost and easy to manufacture and assemble a capless closure and filler tube for a motor vehicle fuel tank which provides adequate vapor-tight sealing after refueling.

BRIEF SUMMARY OF THE INVENTION

The present invention provides a one-way door type valve for sealing a refueling nozzle-receiving orifice in a bulkhead at the upper end of a motor vehicle fuel tank filler tube which accommodates a standard fuel dispensing nozzle and provides for vapor tight sealing upon removal of the nozzle. The capless filler tube fill valve of the present invention employs a unique flexible annular seal attached to the door valve which is biased into contact with a tapered seating surface provided about the nozzle-receiving aperture in the bulkhead and, the door valve is biased toward the seating surface in a manner which effects a wiping seal as the door closes and compression of the seal against a seating surface around the nozzle orifice on the downstream side of the bulkhead. A vacuum relief valve is provided in the door valve to permit make up air to enter the tank or due to diurnal temperature changes when the tank vacuum exceeds a predetermined level.

DETAILED DESCRIPTION OF THE INVENTION

Figure 1:
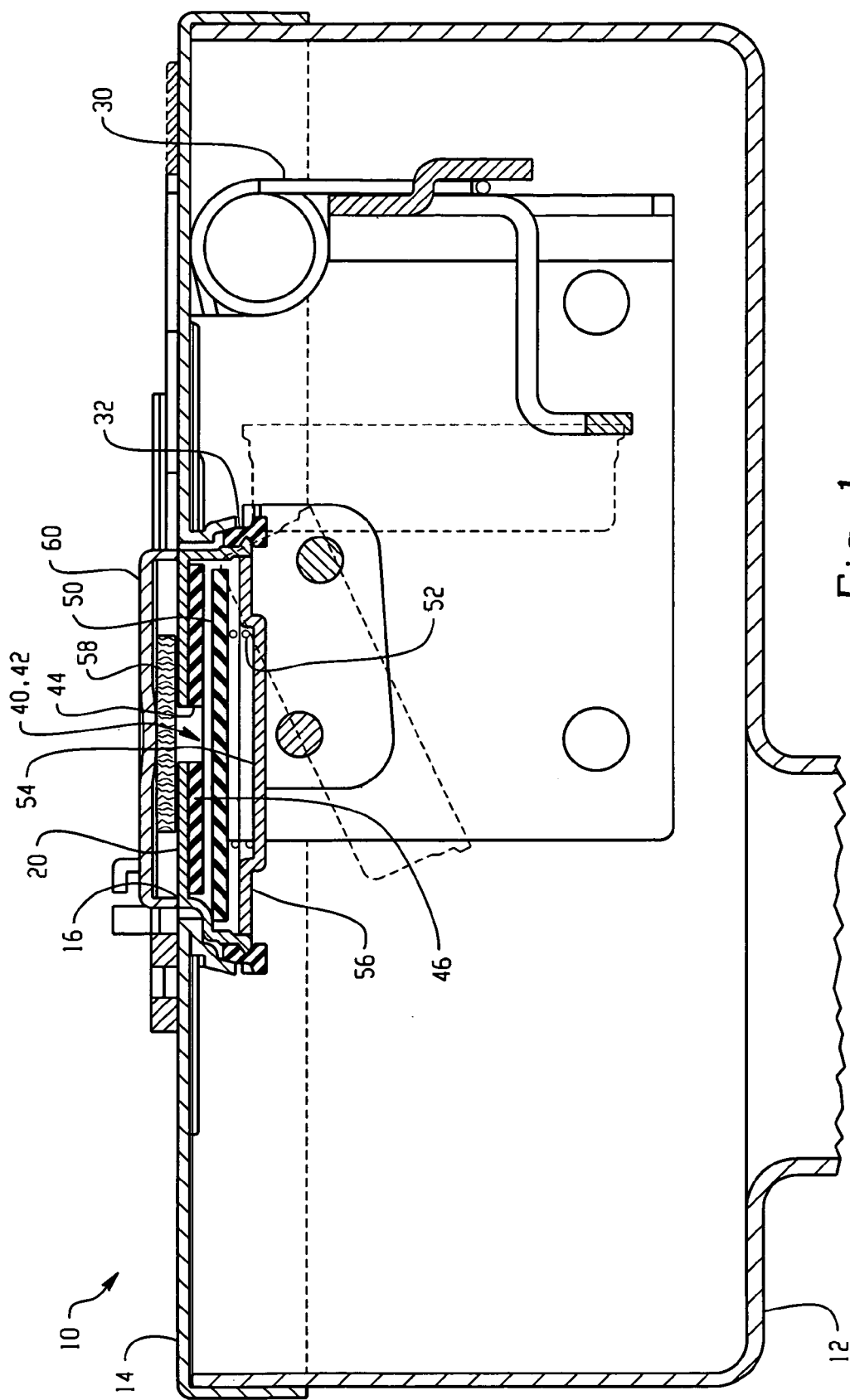
FIG. 1 is a cross section of the upper end of a filler tube for a fuel tank employing an exemplary embodiment of the present invention.
Figure 2:
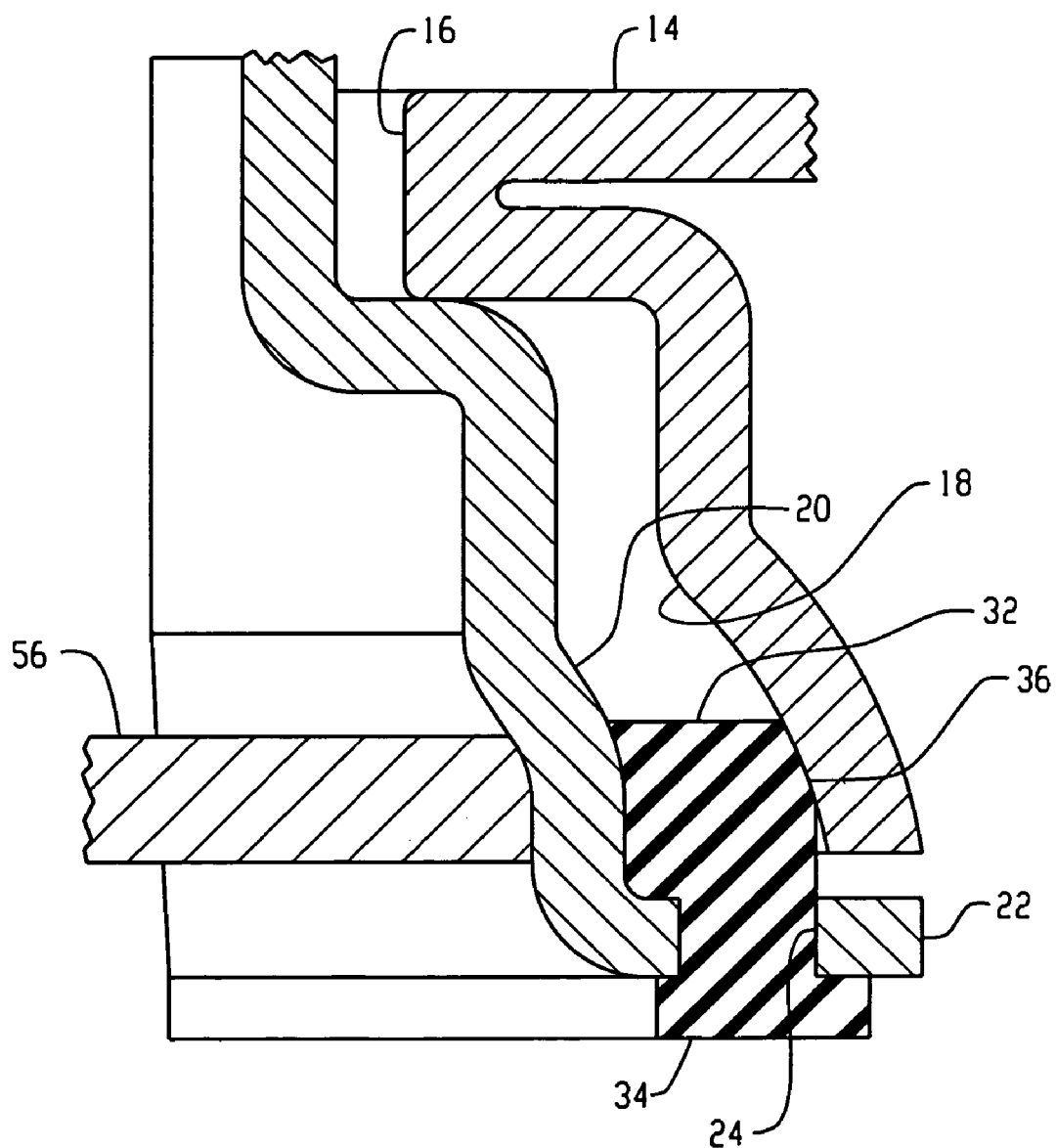
FIG. 2 is an enlarged view of a portion of the cross section of FIG. 1.
Figure 3:
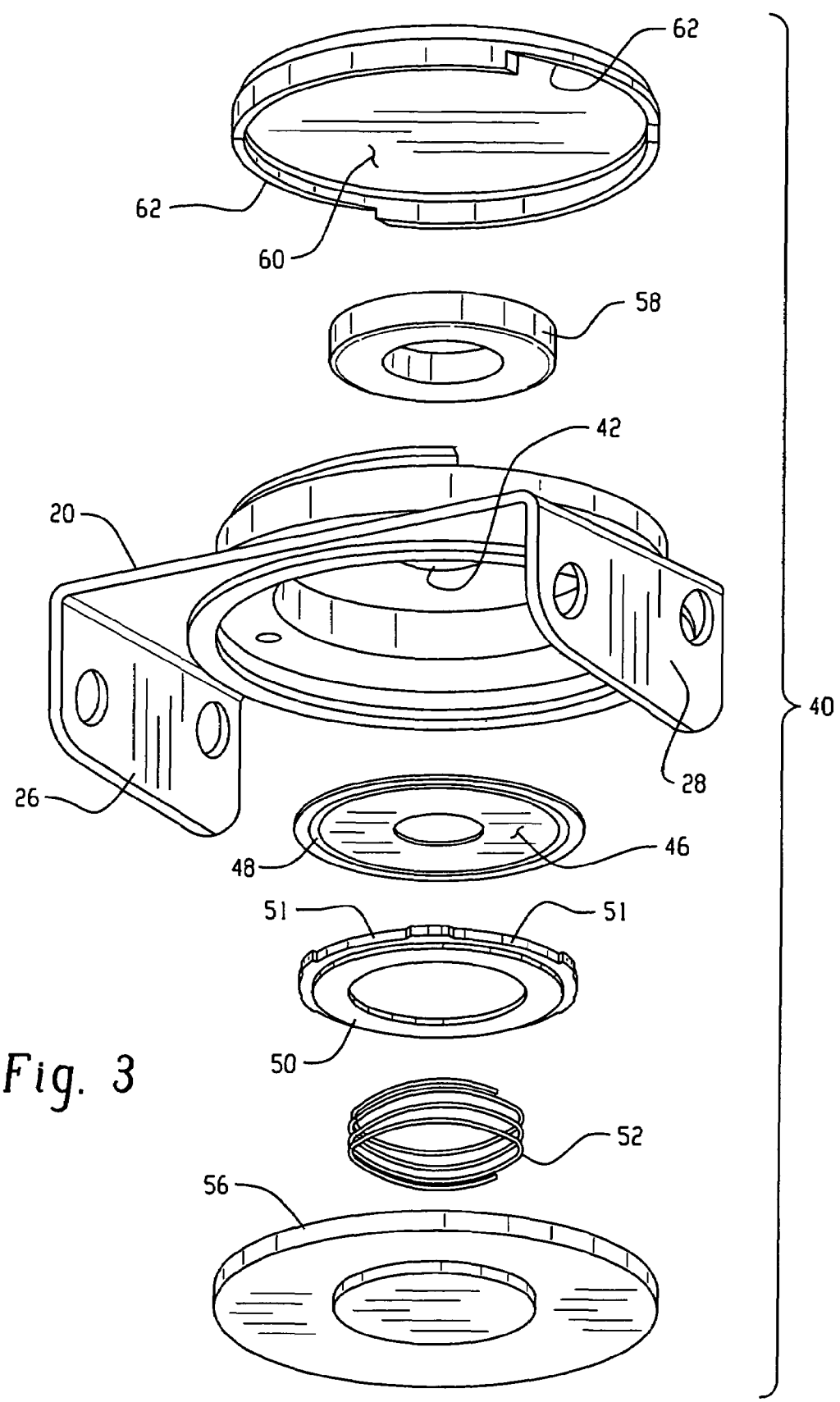
FIG. 3 is an exploded view of the door valve and seal of the embodiment of FIG. 1.

Referring to FIGS. 1 through 3, a fuel tank filler neck or tube upper end with an exemplary embodiment of the present invention is indicated generally at 10 and has an enlarged diameter portion 12 of the tube 10 fitted with a transverse bulkhead 14 at the end thereof. Bulkhead 14 has formed therein a nozzle-receiving aperture 16 which has formed thereabout on the inner or downstream side of the bulkhead 14 an annular valve seating surface 18. If desired, the valve seating surface 18 may have a spherical configuration as illustrated in FIG. 2.

A door valve 20 is disposed on the downstream side of bulkhead 14 over aperture 16 and has a radially outwardly extending annular flange 22 about the periphery thereof which flange has a plurality of apertures 24 formed therein and disposed in spaced arrangement circumferentially thereabout. Door valve 20 also includes a pair of spaced generally parallel flanges 26, 28 formed on opposite sides thereof for attachment to a pivoting mechanism (not shown) provided in the tube portion 12.

Upon insertion of the end of a refueling nozzle through aperture, 16 in the bulkhead, the door is moveable from the closed position shown in solid outline in FIG. 1 to the intermediate position and the fully opened position shown in dashed outline in FIG. 1. A spring 30 is provided within the portion 12 of the filler tube and is operative to bias the door valve 20 in a direction toward the closed position.

Referring to FIGS. 1 and 2, an annular flexible seal 32 is formed on the flange 22 of the door valve 20 such as by insert molding, wherein during the molding operation the material for the seal flows through the apertures 24 and forms a bead rim 34 on the downstream side of the door valve which retains the seal 32 onto the flange 22. The outer periphery of the seal 32 is sized and configured, as denoted by reference numeral 36, to wipe against the valve seating surface, such as spherical surface 18, as the door approaches the fully closed position. In the fully closed position the surface 36 is compressed between the door valve 20 and the surface 18 to ensure a vapor tight seal. As the door approaches the fully closed position, it will be seen that the seating surface 18 and the door valve 20 effect a wedging or camming action of the surface 36 against the seat 18. In the present practice of the invention, the seal 32 may be formed of elastomeric material.

Referring to FIGS. 1 and 3, the door valve 20 includes a vacuum relief valve indicated generally at 40 which includes an air inlet orifice 42 formed centrally in the door valve 20. Valve 40 includes a resilient flexible pad or wafer which may have formed integrally therewith a grommet 46 which is received through orifice 42 and has an outer flange thereof extending over the upward end of the aperture 42. In the embodiment of FIG. 1 the flexible resilient wafer valve 46 has an annular rib 48 disposed thereabout on the downstream side adjacent the outer periphery.

A moveable valve member 50 is disposed against the under surface of wafer 46 and contacts the surface of rib 48 under the urging of a spring 52 which is retained in a recess 54 formed in a retaining plate 56 which is secured to the inner periphery of door valve 20 by any considerable expedient as, for example, weldment.

A layer of filter material 58 is disposed over the upper end of grommet 44 and is retained by cap 60 which may have at least one peripheral cutout 62 formed in the rim thereof for air flow therethrough. Valve member 50 has a plurality of recesses 51 formed about the periphery thereof to permit airflow and keep valve member 50 on center in the door thereby when valve member 50 is pulled downwardly and has moved away from contact with the rib 48 by differential pressure forces resulting from sub-atmospheric pressure in the tank acting thereon.

Figure 4:
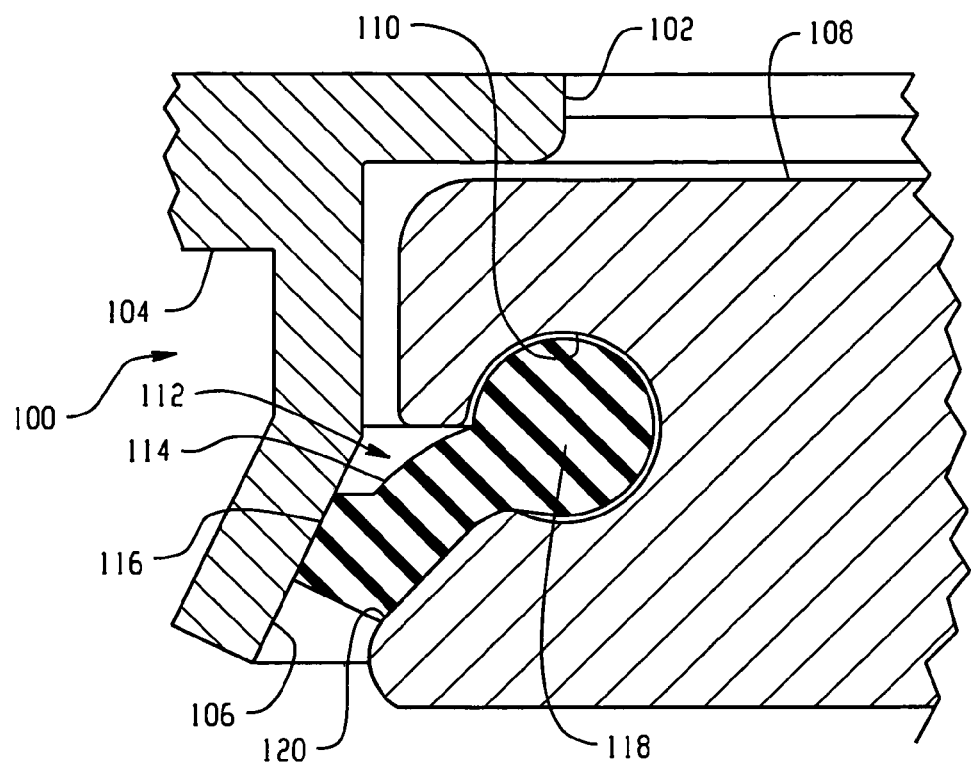
FIG. 4 is a view similar to FIG. 2 of an alternate embodiment of the invention.

Referring to FIG. 4, another embodiment of the invention is indicated generally at 100 in which nozzle-receiving orifice 102 formed in filler tube bulkhead 104 has a valve seating surface 106 formed on the downstream side of the bulkhead which surface 106 has in the embodiment 100 a conically tapered configuration.

A door valve 108 is disposed adjacent aperture 102; and door valve 108 has an annular recess or groove 110 formed in the outer periphery thereof and having received therein a portion of a seal 112.

The flexible annular seal indicated generally at 112 has a relatively thin web portion 114 with a wiper surface 116 formed on the outer periphery thereof and a bead rim 118 formed on the inner periphery thereof. The bead rim 118 is mechanically inserted into the recess or groove 110 by stretching the seal 114 over the outer periphery of the door valve 108.

As the door valve 206 moves toward the closed position, surface 116 makes wiping contact with seating surface 106; and, as door valve 108 closes, a tapered surface 120 provided on the door valve compresses the surface 116 against seating surface 106 as shown in FIG. 4.

Figure 5:
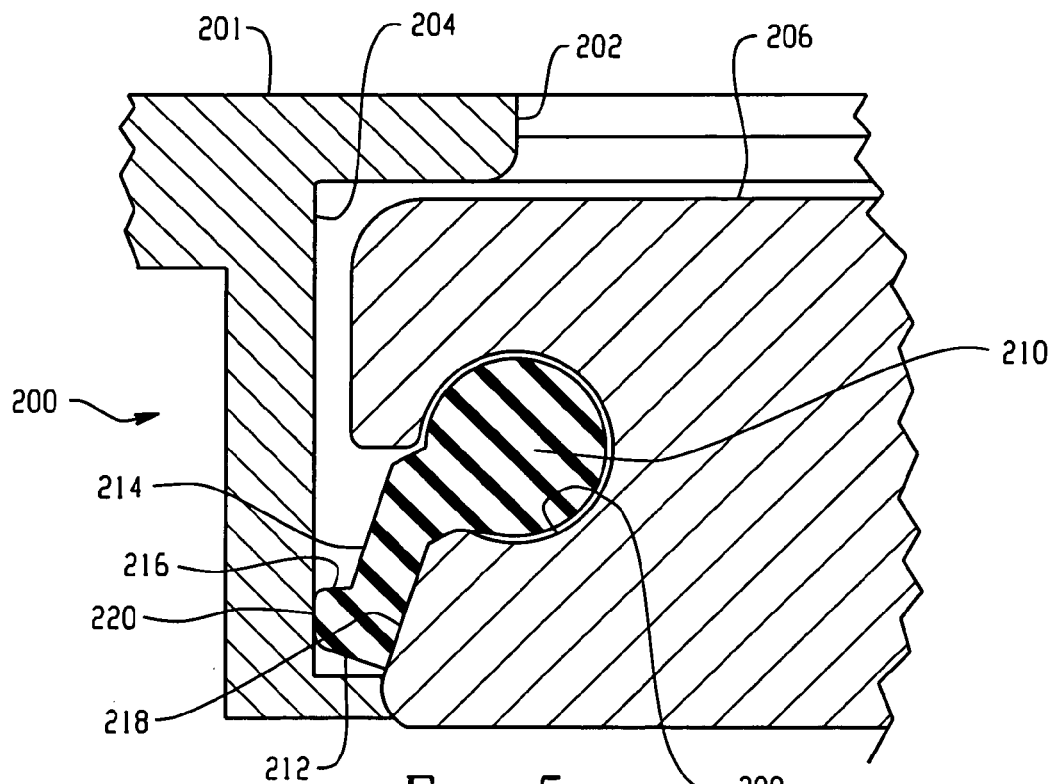
FIG. 5 is a view similar to FIG. 2 of another embodiment of the invention.

Referring to FIG. 5, another embodiment of the invention indicated generally at 200 has a bulkhead 201 provided in the upper end of a filler tube with a nozzle-receiving orifice 202 formed therein. The undersurface or downstream side of bulkhead 201 has formed thereon a generally straight cylindrical valve seating surface 204.

Door valve 206 is disposed for closing the aperture 202; and, the door valve 206 has an annular recess or groove 208 formed in the outer periphery thereof. A bead rim portion 210 is formed on the inner periphery of a flexible annular seal indicated generally at 212. Seal 212 may have a relatively thin web portion 214 extending outwardly from the bead rim 210 which web 214 has an annular rib 216 formed about the outer periphery thereof. The web 214 rests against an annular tapered surface 218 provided about the edge of the groove. 208 formed in the outer periphery of the door.

As the door valve 206 approaches the closed position shown in FIG. 5, the outer edge 220 of rib 216 engages seating surface 204 initially in flexible wiping engagement; and, upon further closing rib 216 is subsequently compressed thereon between the seating surface 204 and tapered surface 218. The wiping action serves to ensure clearing of foreign matter and the compression ensures a positive seal.

Figure 6:
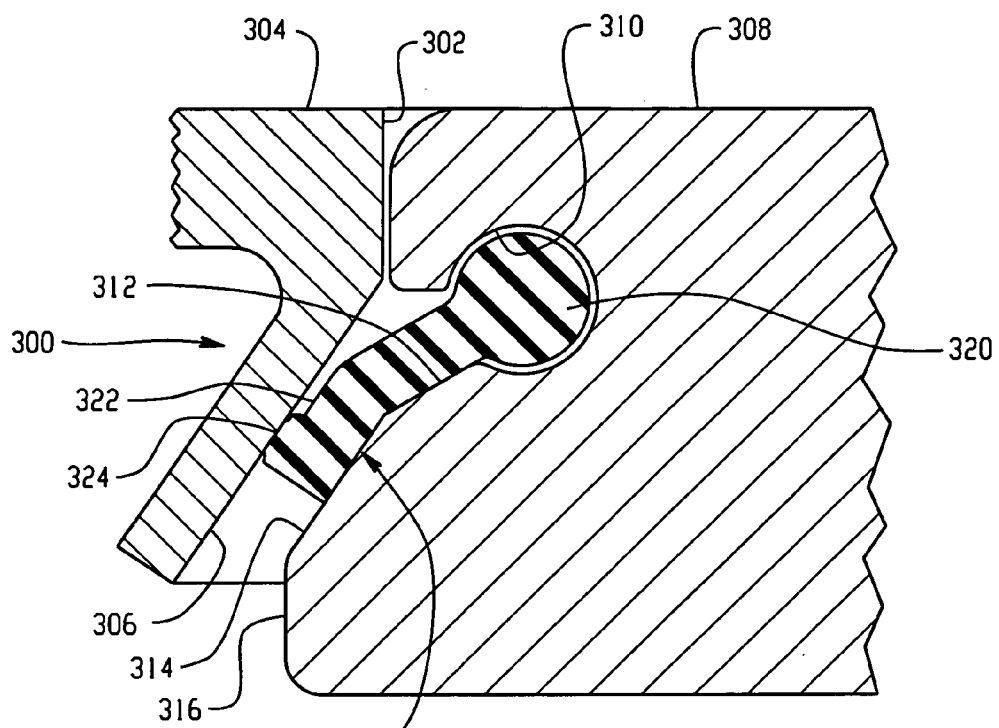
FIG. 6 is a view similar to FIG. 2 showing an additional embodiment of the invention.

Referring to FIG. 6, another embodiment of the invention is indicated generally at 300 and employs a nozzle-receiving aperture 302 formed in a fuel tank filler tube bulkhead 304 which has extendingly downwardly therefrom on the underside thereof an annular tapered valve seating surface 306 suitable for sealing thereagainst.

The tapered valve seating surface 306 of the embodiment of FIG. 6 has a more rapid or generally wider angle of taper than that of an embodiment of FIG. 4 for purposes as will hereinafter be described.

A door valve 308 is disposed on the underside of bulkhead 302 for closing aperture 302. Door valve 308 as an annular recess 310 formed in the outer periphery thereof and has a two-staged tapering surface 312 extending outwardly therefrom at a relatively steep angle of taper and which transitions to a lesser rate of taper to form surface 314 which extends to the outer periphery of door valve 308 at a diameter 316 which is larger than the diameter of orifice 302.

A flexible annular seal indicated generally at 318 has a compound taper formed thereon to conform to surfaces 312 and 314. Seal 318 has an annular bead 320 formed on the inner periphery thereof which it will be understood is stretched over door 308 and mechanically inserted into groove 310. The compound tapered web portion 322 of the seal 318 has an annular rib 324 formed on the outer periphery.

As door valve 308 closes, rib 324 engages the tapered seating surface 306 initially in a wiping contact and upon further closing is compressed between surfaces 314 and surface 306 as the door 308 is moved to the closed position shown in FIG. 6.

Figure 7:
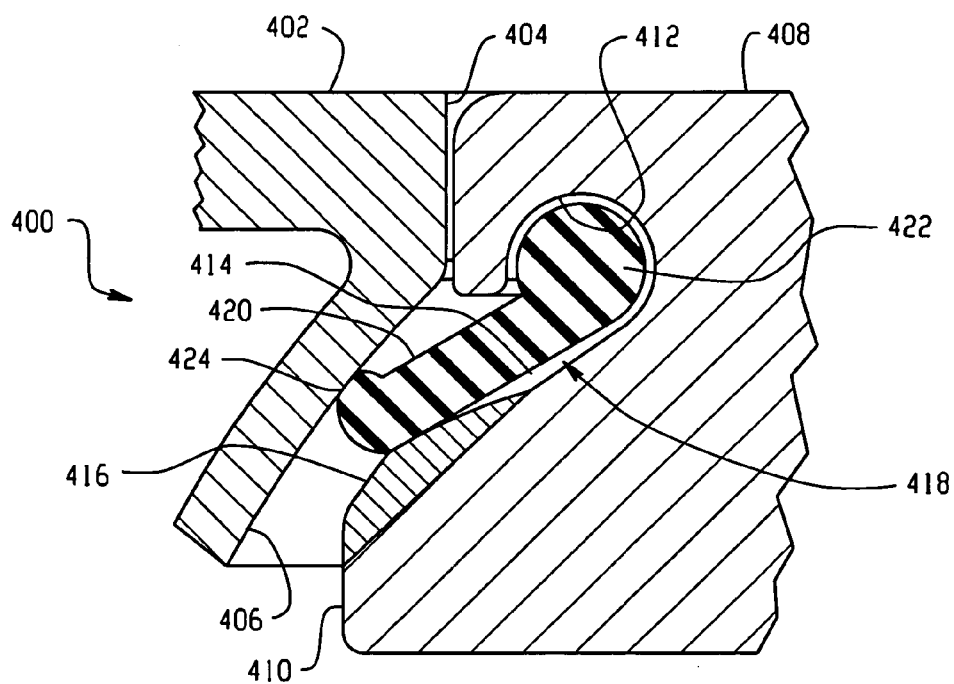
FIG. 7 is a view similar to FIG. 2 showing yet another embodiment of the invention.

Referring to FIG. 7, another embodiment of the invention is indicated generally at 400 having a filler tube bulkhead 402 with a nozzle-receiving orifice 404 formed therein. The downstream or underside of bulkhead 402 may have formed thereon an annular seating surface 406 having a generally spherical configuration.

A door valve 408 is disposed adjacent on the downstream side and positioned for closing aperture 404; and, door valve 408 has a lower portion of the outer periphery denoted 410 as extending to a diameter greater than that of the aperture 404. Door 408 has an annular groove 412 formed in the outer periphery which communicates with a tapered surface 414 extending to the outer periphery. Surface 414 has disposed thereon a backing ring 416 which may have the outer surface thereof formed with a spherical curvature.

A flexible annular seal indicated generally at 418 has a relatively thin web portion 420 with an annular bead rim 422 formed on the inner periphery thereof and which is stretched over the periphery of the door valve 408 and is mechanically lodged in the annular recess 412. The outer periphery of the web 420 has formed thereon a bead rim 424 which functions, as the door 408 is moved to the closed position shown in FIG. 7, to cause rib 424 to initially wipe against sealing surface 406 and then to be compressed between surfaces 406 and 416 as the door reaches the closed position.

The present invention thus provides a unique and novel door valve for the upper end of a fuel tank filler tube which does not require a closure cap. The filler tube door valve of the present invention employs an annular flexible seal disposed on the door which upon closing initially undergoes a wiping action and then compression against a tapered seating surface provided about a nozzle-receiving aperture in a bulkhead at the upper end of the filler tube. The present invention thus provides a positive vapor tight seal for a fuel tank filler tube without the need for a closure cap and does so in a manner which is relatively low in manufacturing costs, is easy to assemble and minimizes the space required for the capless seal.

Although the invention has hereinabove been described with respect to the illustrated embodiments, it will be understood that the invention is capable of modification and variation and is limited only by the following claims.

What is claimed is:

1. A capless filler assembly for a fuel tank comprising:
   a bulkhead with a nozzle guiding aperture therein;
   a valve seating surface disposed on a downstream side of said bulkhead;
   a valve member disposed adjacent said seating surface for movement with respect thereto upon insertion of a nozzle through said aperture, the valve member having an annular flexible seal, the annular flexible seal having a peripheral bead that is secured by one of the bulkhead and the valve member and a web portion that is thinner than the peripheral bead and that has a wiper surface that deflects relative to the peripheral bead in a wiping motion when the web portion contacts the seating surface upon removal of the nozzle from the aperture; and,
   a resilient member that biases said valve member in a direction for effecting said wiping motion and for effecting compression of said seal on said seating surface.

2. The assembly defined in claim 1, wherein peripheral bead on the annular seal is an outer peripheral bead that is secured by the bulkhead.

3. The assembly defined in claim 1, wherein said web portion has a conically tapered configuration.

4. The assembly defined in claim 1, wherein the peripheral bead is an inner peripheral bead secured by said valve member.

5. The assembly defined in claim 1, wherein said valve member is mounted for pivotal movement.

6. The assembly defined in claim 1, wherein said valve seating surface includes portions having a spherical curvature.

7. The assembly defined in claim 1, wherein said valve member includes an outwardly extending peripheral flange having a plurality of apertures and said annular seal has first portions disposed on opposite sides of said flange, with second portions extending through said apertures and interconnecting said first portions.

8. A method of making a capless filler assembly for a fuel tank comprising:
   disposing a bulkhead with a nozzle guiding aperture;
   disposing a valve seating surface on a downstream side of said bulkhead;
   disposing a valve member adjacent said seating surface for movement with respect thereto;
   securing an annular flexible seal to one of the bulkhead and the valve member by engaging a peripheral bead on the annular flexible seal with said one of the bulkhead and the valve member; and, biasing said member in a direction toward said seating surface and effecting a wiping motion of a relatively thin web portion of the annular flexible seal, wherein the web portion is thinner than the peripheral bead; and
   compressing said seal on said seating surface and blocking the flow path.

9. The method defined in claim 8, wherein the peripheral bead is an outer peripheral bead that is secured by the bulkhead in the securing step.

10. The method defined in claim 8, wherein the peripheral bead is an inner peripheral bead that is secured by the valve member in the securing step.

11. The method defined in claim 8, wherein said step of disposing a valve seating surface includes forming a conically tapered surface.

12. The method defined in claim 8, wherein said step of disposing a valve member includes disposing a vacuum relief valve on the valve member and biasing the vacuum relief valve in contact with a second flexible seal and effecting said compression.

13. The method defined in claim 8, wherein said step of disposing an annular flexible seal includes forming a plurality of apertures about the periphery of said valve member and molding seal material therethrough and interconnecting portions of the seal on opposite sides of said valve member.

14. A capless filler assembly for a fuel tank comprising:
   a bulkhead with a nozzle guiding aperture therein;
   a one-way valve disposed in the flow path on the downstream side of the bulkhead with a valve seating surface and a valve member biased thereagainst for blocking the flow path, the valve operable to be opened upon insertion of a nozzle in said aperture, wherein said valve member includes an annular flexible seal, the annular flexible seal having a peripheral bead that is secured by one of the bulkhead and the one-way valve and a web portion that is thinner than the peripheral bead and that has a wiper surface that deflects relative to the peripheral bead upon withdrawal of the nozzle to effect sequentially a wiping motion and including structure operable to effect compression of said seal on said seating surface.

15. The assembly defined in claim 14, wherein said valve member includes a door disposed for pivotal movement.

* * * * *